US011924556B2

(12) United States Patent
Kiran Urs et al.

(10) Patent No.: US 11,924,556 B2
(45) Date of Patent: Mar. 5, 2024

(54) AUTOMATIC PREDICTION OF EXPOSURE OF CAMERA IN PROJECTOR-CAMERA SYSTEMS

(71) Applicant: Summit Technology Laboratory, Irvine, CA (US)

(72) Inventors: Meghana Kiran Urs, Irvine, CA (US); Bharati Jha, Irvine, CA (US); Alexander Sidenko, Irvine, CA (US)

(73) Assignee: SUMMIT TECHNOLOGY LABORATORY, Irvine, CA (US)

( * ) Notice: Subject to any disclaimer, the term of this patent is extended or adjusted under 35 U.S.C. 154(b) by 0 days.

(21) Appl. No.: 17/849,517

(22) Filed: Jun. 24, 2022

(65) Prior Publication Data
US 2023/0421910 A1    Dec. 28, 2023

(51) Int. Cl.
*H04N 23/73* (2023.01)
*G06T 7/80* (2017.01)
*H04N 5/58* (2006.01)

(52) U.S. Cl.
CPC .............. *H04N 23/73* (2023.01); *G06T 7/80* (2017.01); *H04N 5/58* (2013.01)

(58) Field of Classification Search
CPC ............. H04N 23/73; H04N 5/58; G06T 7/80
See application file for complete search history.

(56) References Cited

U.S. PATENT DOCUMENTS

| 9,532,023 | B2 * | 12/2016 | Hung | H04N 7/141 |
| 10,798,373 | B2 * | 10/2020 | Speigle | G09G 5/10 |
| 2007/0091201 | A1 * | 4/2007 | Sasaki | G03B 21/53 |
| | | | | 348/E5.037 |

* cited by examiner

*Primary Examiner* — Ahmed A Berhan
(74) *Attorney, Agent, or Firm* — NGUYEN TARBET LLC (57) ABSTRACT

The present invention is directed to predicting and optimizing the exposure value of cameras in order to properly capture images, achieve robust and efficient calibration, and detect faults. The present invention features a method comprising displaying one or more reference images and using the camera to capture the reference image at one or more camera exposures. This allows an optimal camera exposure and an optimal reference image to be determined. The method may further comprise estimating ambient light. The method may further comprise the display device displaying an input image and identifying relative properties of the input image in comparison to the reference image. The method may further comprise predicting an optimal exposure based on the relative properties of the input image, ambient light, and the optimal reference exposure, adjusting the exposure value of the camera based on the optimal exposure, and capturing the input image at the proper exposure.

29 Claims, 5 Drawing Sheets

AUTOMATIC PREDICTION OF EXPOSURE OF CAMERA IN PROJECTOR-CAMERA SYSTEMS

STATEMENT REGARDING FEDERALLY SPONSORED RESEARCH OR DEVELOPMENT

This invention was made with government support under Grant No. FA86492000037 awarded by USAF Research Lab AFRL SBRK. The government has certain rights in the invention.

FIELD OF THE INVENTION

The present invention is directed to predicting and optimizing the exposure value of cameras to properly capture images of a display, achieve efficient calibration, and detect changes to the ambient light quickly.

BACKGROUND OF THE INVENTION

For a projection mapping system containing single or multiple projectors or display panels, calibration is a necessary process to tile or map them into one seamless display screen. Many times camera-captured images of such displays are used for calibration. Further, camera-captured images can be used for monitoring display quality by checking for any misregistrations or other faults in the display system that can occur due to movements or device failures. Capturing displayed images at the correct exposure, to avoid over- or under-exposure which would result in washed-out or dark images, is the key to achieving good calibration and fault detection. Cameras used in this process lack intelligence to set a precise correct exposure to capture projected images even if they are in auto exposure mode. Auto exposure detects the general ambient light of the environment in which the subject of the image resides instead of the brightness of the subject itself. The algorithm developed aims at predicting the appropriate exposure to capture any known image being projected on the display screen. With faster computing hardware, these computations can be done in real-time.

Camera manufacturing companies have exposure control algorithms that adjust exposure based on the average luminance of the first image, which works only if the average luminance of the first image is similar to any future image which isn't the case with display screen-based systems. Another method is predicting exposure using a luminance sensor to measure the ambient lighting conditions. In a scenario where the subject of the image is a digital display (e.g. a panel or projection), the ambient light of the surrounding often remains the same leading to unmodified camera exposure, when at the same time the displayed image can vary significantly in brightness. Projection mapping companies set a predetermined exposure with respect to a known ambient light condition (normally with all lights off, dark environment) and capture images required for calibration. This can be categorized as a manual or semi-manual procedure for deciding camera exposures.

BRIEF SUMMARY OF THE INVENTION

It is an objective of the present invention to provide systems and methods that allow for the prediction of ambient light and adjustment of an exposure value of a camera in response to said prediction, as specified in the independent claims. Embodiments of the invention are given in the dependent claims. Embodiments of the present invention can be freely combined with each other if they are not mutually exclusive.

The present invention features a method for prediction of ambient light and adjustment of an exposure value of a camera in response to said prediction. The method may comprise displaying one reference image and using the camera to capture the reference image at a plurality of camera exposures or displaying a plurality of reference images and capturing them at one exposure. Based on a minimal saturation criterion applied to the plurality of images, an optimal camera reference exposure or an optimal reference image for a fixed camera exposure, which is the optimal camera reference exposure to the optimal reference image, can be determined. The method may further comprise estimating ambient light by displaying a black image and capturing the displayed image at the optimal camera reference exposure. The method may further comprise identifying relative properties of an arbitrary input image captured by the camera in comparison to the reference image and predicting an optimal exposure based on the relative properties of the input image and the optimal reference exposure. The method may further comprise adjusting the exposure value of the camera based on the optimal exposure, displaying, by a display device, the input image, and capturing the input image at the optimal exposure to achieve robust calibration and/or fault detection.

The present invention features a system for prediction of ambient light and adjustment of an exposure value of a camera in response to said prediction. In some embodiments, the system may comprise the camera capable of capturing images and a display device capable of displaying images. The system may further comprise a computing device capable of causing the display device to project a reference image, causing the camera to capture one or more reference images at one or more camera exposures to generate a plurality of calibration images, and predicting an optimal reference exposure based on a minimal saturation criterion applied to the plurality of calibration images. The computing device additionally may be capable of causing the display device to display an input image, identifying relative properties of the input image in comparison to the reference image, and predicting an optimal exposure based on the relative properties of the input image and the optimal reference exposure. The computing device may additionally be capable of adjusting the exposure value of the camera based on the optimal exposure and capturing, by the camera, the input image on the display at the proper exposure to achieve robust and efficient calibration and/or fault detection.

Traditional camera exposure control works on the principle of measuring the ambient light of the surrounding using various methods (e.g. a photodiode) and adjusting the exposure of subjects (e.g. humans, objects) to be captured when they are present in that ambient lighting. The situation is different if a digital display device is the subject and usually has very different lighting than the ambient light. Therefore, auto exposure methods fail when the displayed image changes while the ambient light remains the same. Unlike prior art, in the present method, the predicted exposure will depend both on the displayed image and the ambient light, not just on the ambient light.

The inventive feature of the present invention comes from using a reference image on the display device itself to anchor the exposure prediction so that high precision prediction can be achieved for any arbitrary image. Using the fact that the image going to the display is known a priori, the present invention compares statistically with the reference image to predict the right exposure. The predicted exposure can then be used as the exposure of the sensor or camera just before capturing the displayed image. Interestingly, the same criterion used on the reference image to find its appropriate exposure can now be used on the captured arbitrary image to detect a change in ambient light if it changes after the capture of the reference image. Therefore, the same metric can be used in a feedback loop to estimate the change in ambient light and adjust the baseline exposure of the reference image for future use.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWING(S)

The features and advantages of the present invention will become apparent from a consideration of the following detailed description presented in connection with the accompanying drawings in which:

FIGS. 3A-3B show examples of reference images used for determining an optimal exposure value for a camera in the present invention.

DETAILED DESCRIPTION OF THE INVENTION

Figure 1:
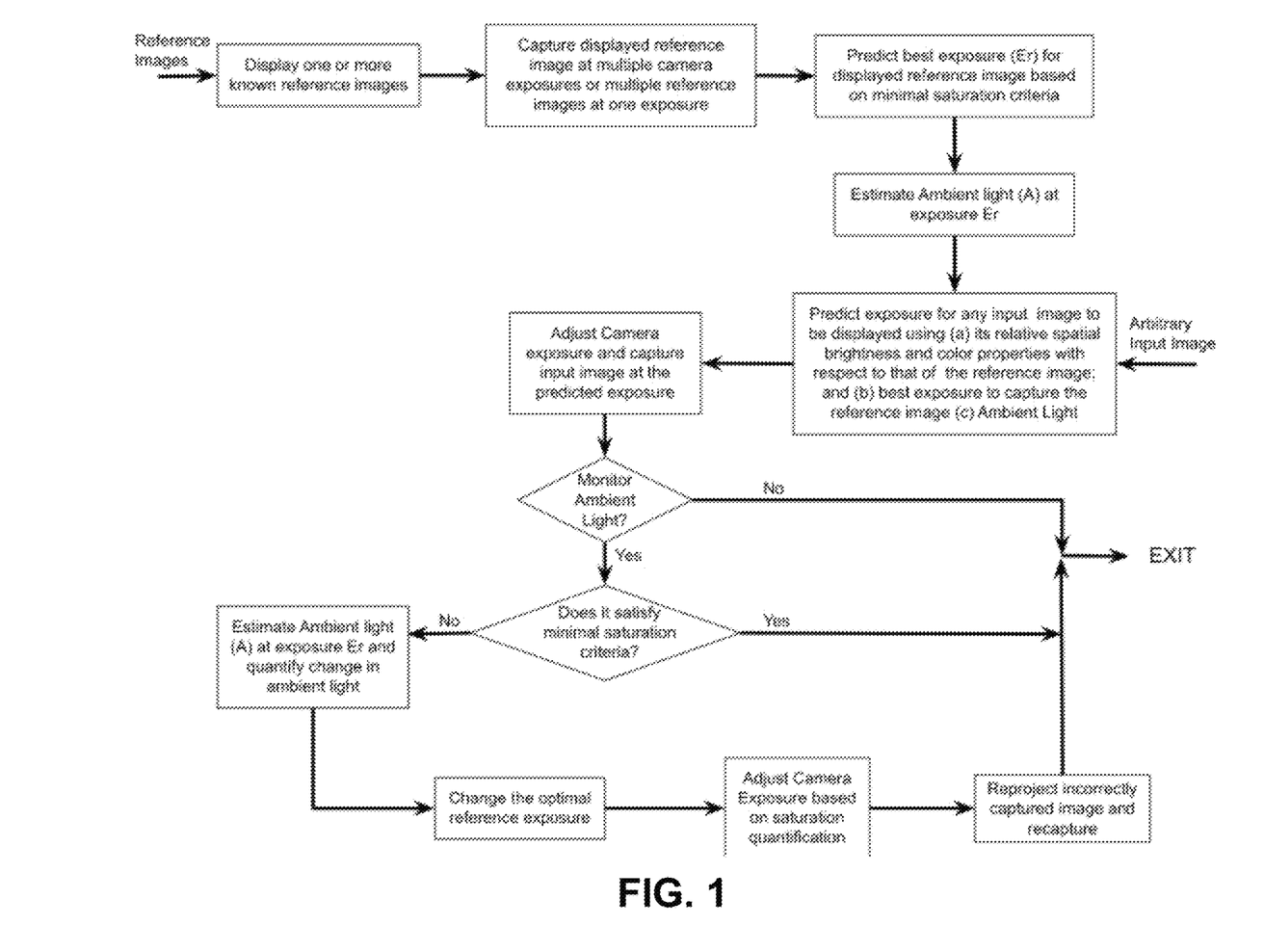
FIG. 1 shows a flow chart of the method for real-time prediction of ambient light and adjustment of an exposure value of a camera in response to said prediction of the present invention.

Following is a list of elements corresponding to a particular element referred to herein:
100 camera
200 display device
300 computing device Referring now to FIG. 1, the present invention features a method for real-time prediction of ambient light and adjustment of an exposure value of a camera (100) in response to said prediction. In some embodiments, the method may comprise a display device (200) displaying a reference image and the camera (100) capturing the reference image at a plurality of camera exposures, or the display device (200) displaying a plurality of reference images and the camera (100) capturing the reference images at one exposure to generate a plurality of calibration images. The method may further comprise predicting an optimal reference image and the corresponding optimal camera exposure based on a minimal saturation criterion applied to the plurality of calibration images. These steps serve to initially calibrate the camera exposure of the present invention. The method may further comprise computing relative properties of the input image in comparison to the reference image. The method may further comprise predicting an optimal exposure based on the relative properties of the input image and the optimal reference exposure, adjusting the exposure value of the camera (100) based on the optimal exposure, displaying the input image on the display device (200), and capturing, by the camera (100), the displayed input image. This allows the camera (100) to quickly adjust to any image and process it correctly to achieve robust calibration and fault detection.

In some embodiments, the method may further comprise the display (200) displaying a black image and the camera (100) capturing the displayed black image in the presence of ambient light. When black is displayed by a display device and captured in the dark (with no ambient light) by a camera, it is captured as relatively black. However, in the presence of ambient light, the captured image of a displayed black is a gray that increases with the increase in ambient light due to the added light on the surface itself. The display devices' black level is also accounted for as ambient light if the ambient light is estimated by displaying a black image.

In some embodiments, the ambient light is computed as the average of the image captured by the camera at a certain exposure by masking out non-display regions of the captured image, when the display devices are powered off. When the display devices are powered off, the display devices' black level is not considered as part of ambient light estimation.

In some embodiments, the camera (100) and the display device (200) may be coupled into a single device. In some embodiments, the camera (100) and the display device (200) may be communicatively coupled to a computing device (300) by a wireless component or by a wired component. The relative properties of the input image may comprise spatial brightness and color properties. The reference image may comprise a pattern of black pixels and non-black pixels comprising 25% to 75% black pixels and 25% to 75% non-black pixels. The pattern of the reference image may comprise stripes, blobs, or patches of different sizes. In some embodiments, the camera can have a fish-eye lens, the display devices may be projectors or panels, and the display surface may be planar or non-planar.

In the present invention, the term exposure is used to refer to either the shutter speed of the camera or the aperture size. In fixed aperture cameras, shutter speed is changed based on the exposure estimation, and in variable aperture cameras, either the aperture size or the shutter speed can be changed.

In the present invention, the camera-captured images can be either grayscale images or color images. The camera captured images could be still images or a video sequence.

Figure 2:
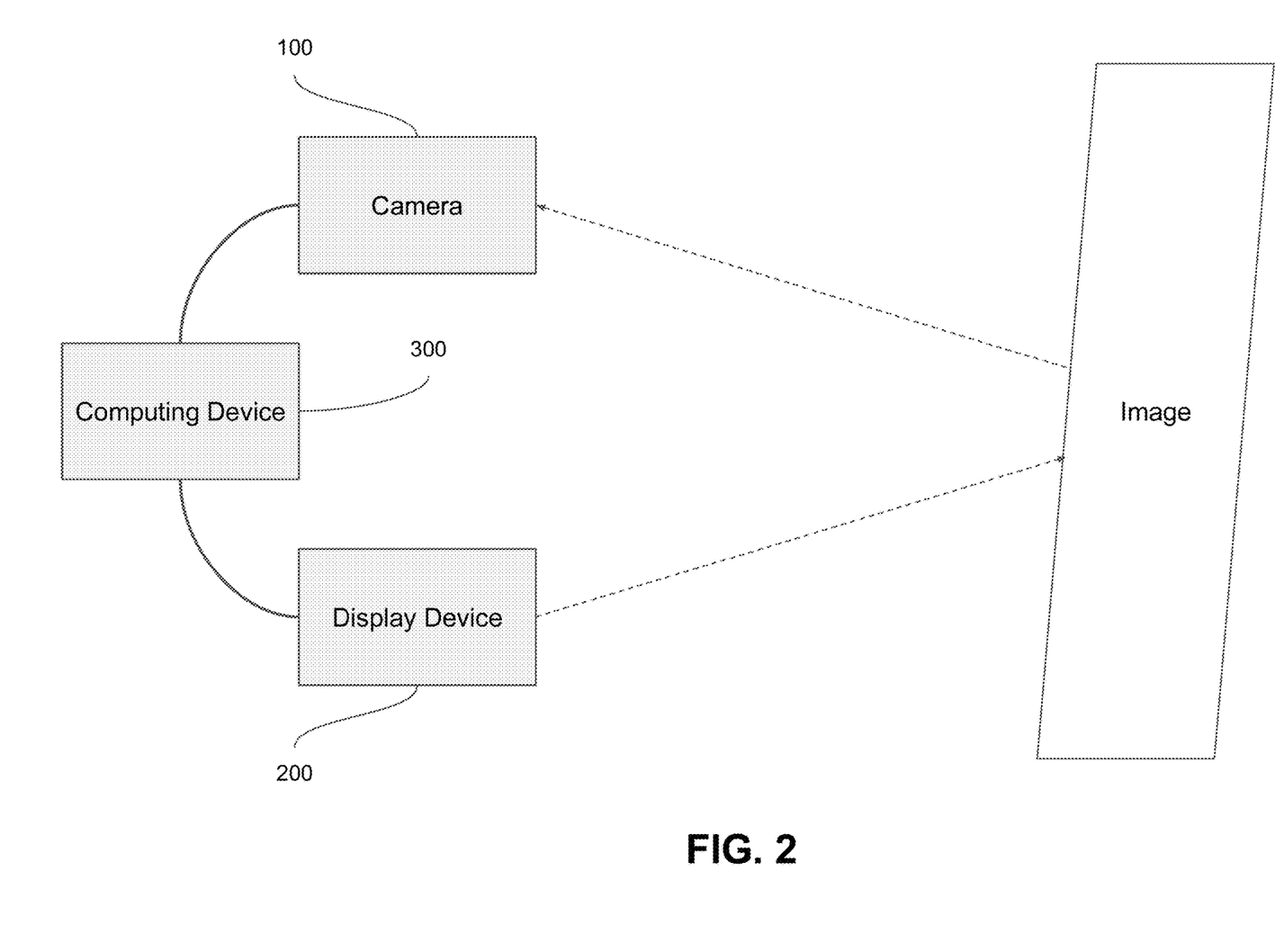
FIG. 2 shows a schematic of the system for real-time prediction of ambient light and adjustment of an exposure value of a camera in response to said prediction of the present invention.

Referring now to FIG. 2, the present invention features a system for detecting real-time change of ambient light, quantifying ambient light change, and adjustment of a baseline reference exposure value of a camera (100) in response to said quantification. In some embodiments, the system may comprise the camera (100) capable of capturing images and a display device (200) capable of displaying images. The system may further comprise a computing device (300) communicatively coupled to the camera (100) and the display device (200), comprising a processor capable of executing computer-readable instructions and a memory component comprising computer-readable instructions. The computer-readable instructions may comprise displaying, by the display device (200), a reference image, capturing, by the camera (100), the reference image at a plurality of camera exposures, or displaying a plurality of reference images and capturing by the camera (100) at one exposure, to generate a plurality of calibration images, and predicting an optimal reference exposure and the corresponding optimal reference image based on a minimal saturation criterion applied to the plurality of calibration images. These steps serve to initially calibrate the camera exposure of the present invention. The computer-readable instructions may further comprise displaying, by the display device (200), an input image, identifying relative properties of the input image in comparison to the reference image, and predicting an optimal exposure based on the relative properties of the input image and the optimal reference exposure. The computer-readable instructions may further comprise adjusting the exposure value of the camera (100) based on the optimal exposure and capturing, by the camera (100), the input image.

In some embodiments, the memory component may further comprise instructions for detecting, by the camera (100), ambient light affecting the input image and determining whether the input image satisfies the minimal saturation criteria with respect to the ambient light. If the input image does not satisfy the minimal saturation criteria with respect to the ambient light, the change in saturation based on the ambient light is quantified. The computer-readable instructions may further comprise adjusting the exposure value of the camera (100) based on the quantified change, changing a baseline reference exposure value of the camera (100) to account for the ambient light, and redisplaying, by the display device (200), the input image.

Figure 3A:
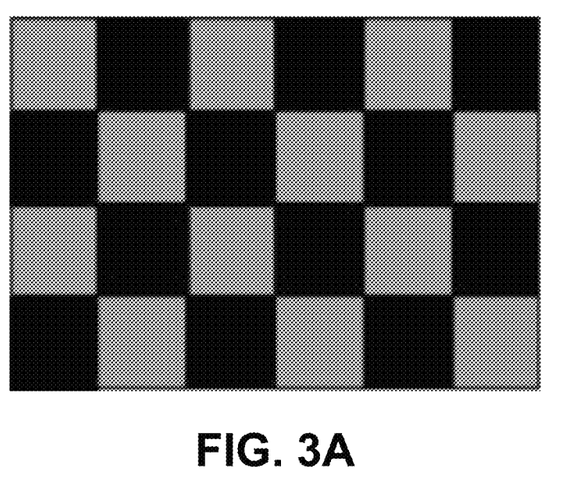
Figure 3B:
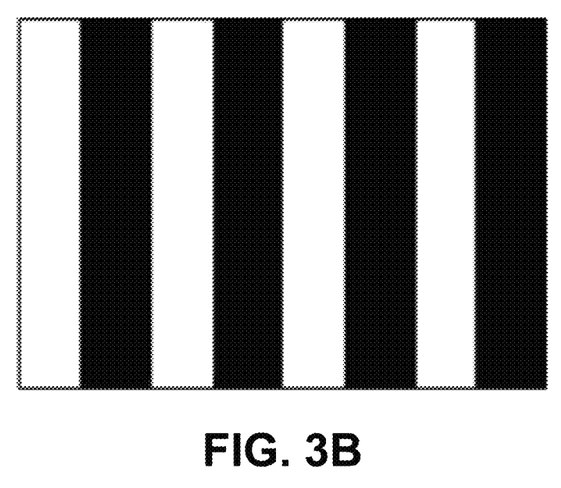
FIG. 3B specifically shows an exemplary example of a reference image.
Figure 4:
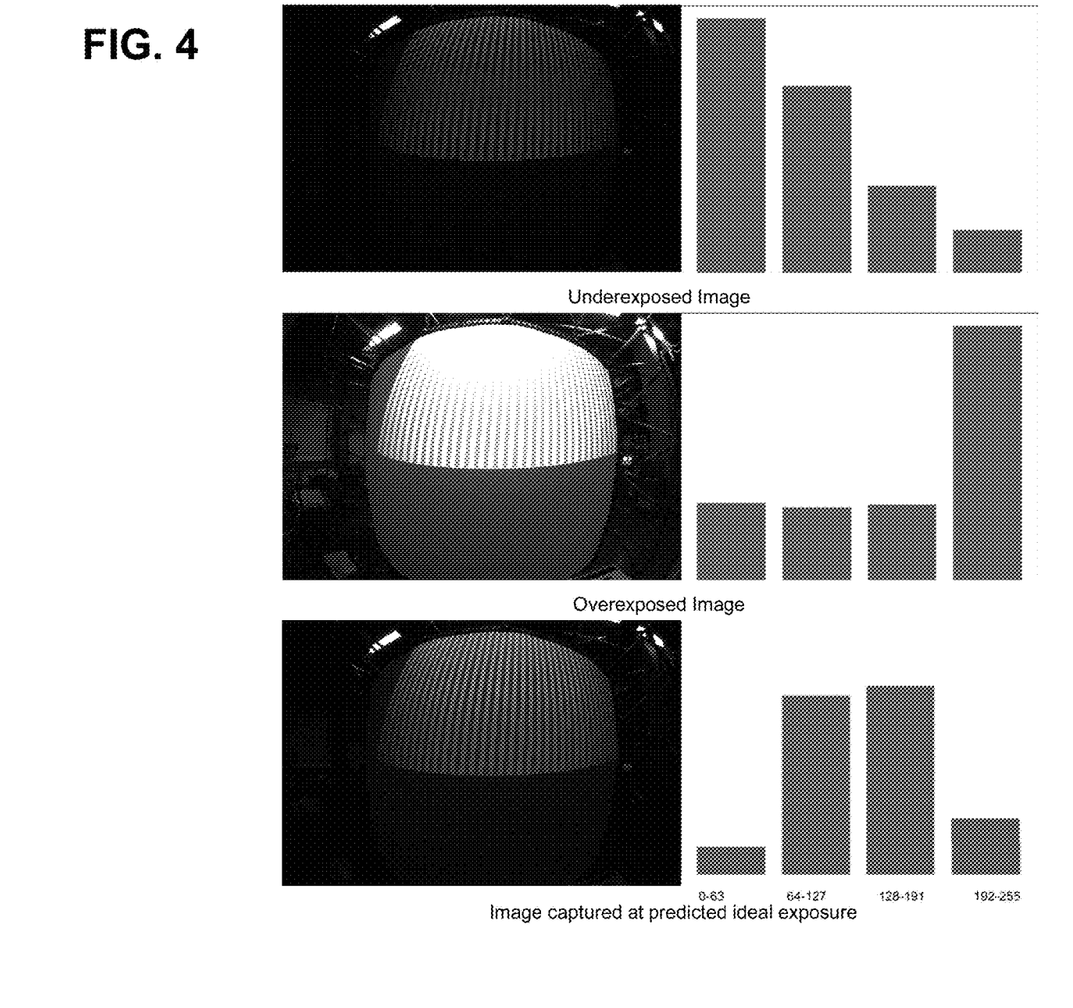
FIG. 4 shows a reference image captured in different exposures (Column 1) and their histograms (Column 2).
Figure 5:
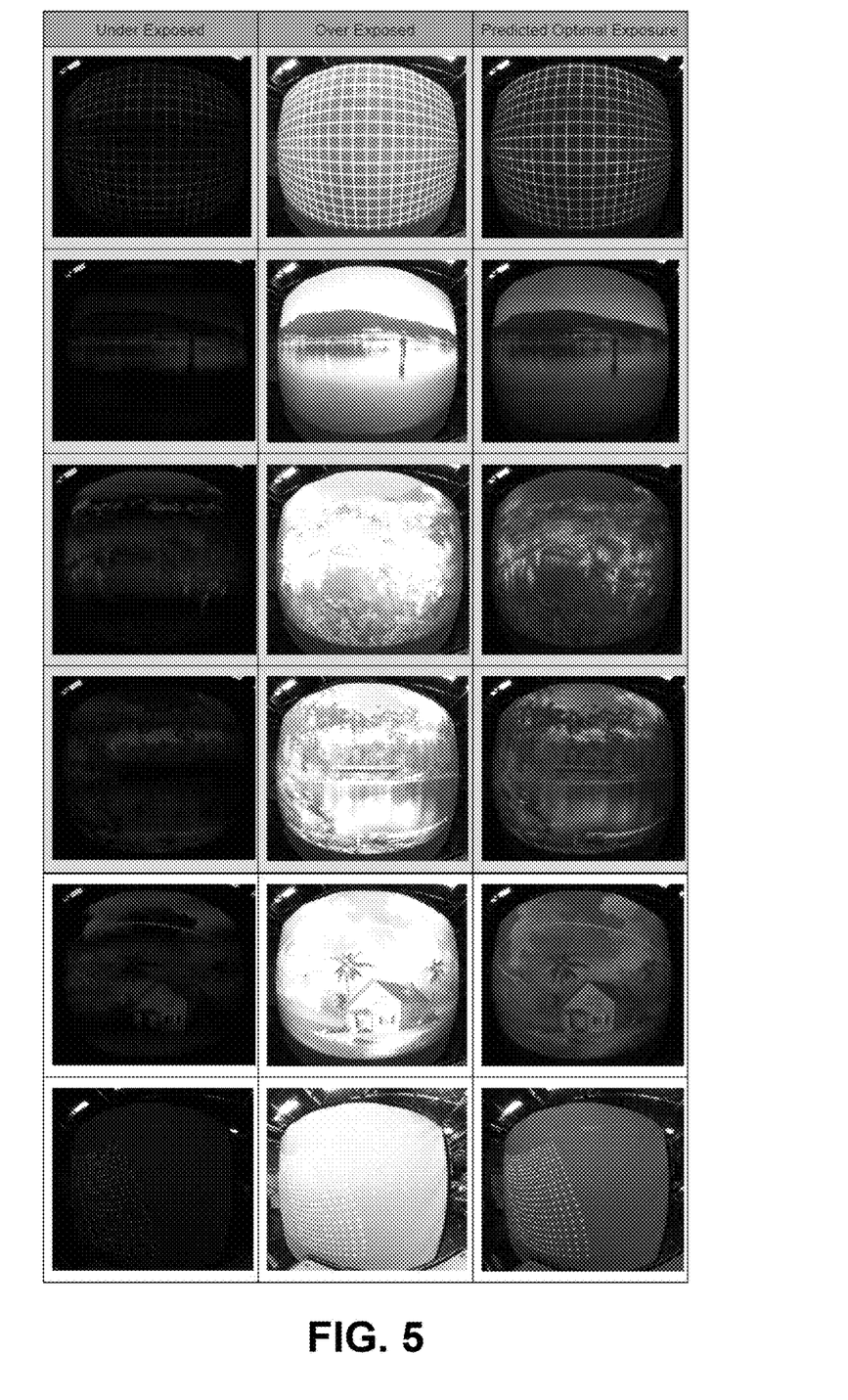
FIG. 5 shows a table of results of the algorithm of the present invention.

One way to compute the optimal reference exposure is to display, by the display device, a known reference image, and capture, by the camera, said reference image at multiple exposures (see FIG. 4). The reference image is around x % black and (100-*x*)% any other color pixels, where x is a number between 25-75%. The reference image pattern can be stripes, blobs, patches of different sizes, or anything else (FIGS. 3A-3B). Each captured image is tested for minimal saturation criteria. One way to implement this criterion may be to check the number of under and oversaturated pixels in the captured image by binning all the pixels into a histogram with k bins, for example, k=4. Any image is said to be captured at the right exposure if the histogram is well balanced, meaning only a very small number of pixels are under or overexposed (the image should not be too bright or too dark). The image that agrees with this criterion is considered to be the image captured at ideal exposure for that particular ambient light condition. This reference image exposure is used to predict exposure for any future image along with a relative comparison of the distribution of the brightness and colors of the future image with respect to that of the reference image.

In some embodiments, a known reference image is displayed on the display device and captured by the camera at multiple exposures. An image can be captured correctly in a range of ideal exposures. To make sure the image is not overexposed, some white content is needed in the reference image so that the white pixel values in the captured image can be capped to a specific threshold. This gives the upper limit of the ideal exposure range. To avoid underexposing an image, there need to be gray value pixels in the reference image which, in the captured image using a specific exposure, have to be above a fixed threshold brightness. This exposure gives the lower limit of the ideal exposure range. The value chosen as the best exposure for capture among the range of ideal exposures depends on the display surface and application. If the application needs the camera frames per second (FPS) to be high, then the lowest best exposure is chosen, since exposure is inversely proportional to FPS. If the application needs more contrast in the captured image, then choosing the upper limit of ideal exposures is the best option. This reference image exposure is used to predict exposure for any future image along with a relative comparison of the distribution of the brightness and colors of the future image with respect to that of the reference image.

Although there has been shown and described the preferred embodiment of the present invention, it will be readily apparent to those skilled in the art that modifications may be made thereto which do not exceed the scope of the appended claims.

Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A method for prediction of ambient light and adjustment of an exposure value of a camera (100) in order to capture a display of an input image, in response to said prediction, the method comprising:
   a. displaying, by a display device (200), one or more reference images;
   b. capturing, by the camera (100), the one or more reference images at one or more camera exposures to generate a plurality of calibration images;
   c. predicting an optimal reference exposure and a corresponding optimal reference image based on a minimal saturation criterion applied to the plurality of calibration images;
   d. estimating the ambient light at the optimal reference exposure;
   e. identifying relative properties of an input image in comparison to the optimal reference image;
   f. predicting an optimal exposure based on the relative properties of the input image, the ambient light and the optimal reference exposure;
   g. adjusting the exposure value of the camera (100) based on the optimal exposure;
   h. displaying by the display device (200) the input image; and
   i. capturing, by the camera (100), the input image.

2. The method of claim 1 further comprising:
   a. identifying differences between a predicted saturation of the input image and the saturation of the captured input image, and
   b. changing a baseline exposure value of the camera (100) to account for the differences.

3. The method of claim 1 further comprising:
   a. detecting, by the camera (100), change in the ambient light by determining whether the captured input image satisfies the minimal saturation criterion;
   b. estimating new ambient light at the optimal reference exposure;

c. changing the optimal reference exposure value of the camera (100) to account for the new ambient light; and d. changing the ambient light to the new ambient light.

4. The method of claim 1, wherein the camera (100) and the display device (200) are coupled into a single device.

5. The method of claim 1, wherein the camera (100) and the display device (200) are communicatively coupled to a computing device (300).

6. The method of claim 1, wherein the camera (100) and the display device (200) are coupled to the computing device (300) by a wireless component.

7. The method of claim 1, wherein the camera (100) and the display device (200) are coupled to the computing device (300) by a wired component.

8. The method of claim 1, wherein the relative properties of the input image comprise spatial brightness and color properties.

9. The method of claim 1, wherein the reference image comprises a pattern of black pixels and non-black pixels.

10. The method of claim 9, wherein the reference image comprises 25% to 75% black pixels.

11. The method of claim 9, wherein the pattern of the reference image comprises stripes, blobs, or patches of different sizes.

12. The method of claim 1, wherein the display device comprises a projector or a display panel.

13. The method of claim 1, wherein the exposure prediction and control is done to capture videos in real-time. 75% black pixels.

14. The method in claim 1, wherein the display surface is planar or non-planar.

15. A system for prediction of ambient light and adjustment of an exposure value of a camera (100) to capture a display of an input image in response to said prediction, the system comprising:
  a. the camera (100) capable of capturing images;
  b. a display device (200) capable of displaying images; and
  c. a computing device (300) communicatively coupled to the camera (100) and the display device (200), comprising a processor capable of executing computer-readable instructions and a memory component comprising computer-readable instructions for:
    i. displaying, by the display device (200), one or more reference images;
    ii. capturing, by the camera (100), the reference images at one or more camera exposures to generate a plurality of calibration images;
    iii. predicting an optimal reference exposure and a corresponding optimal reference image based on a minimal saturation criterion applied to the plurality of calibration images;
    iv. estimating the ambient light at the optimal reference exposure;
    v. identifying relative properties of an input image in comparison to the optimal reference image;
    vi. predicting an optimal exposure based on the relative properties of the input image, the ambient light and the optimal reference exposure;
    vii. adjusting the exposure value of the camera (100) based on the optimal exposure;
    viii. displaying by the display device (200) the input image; and
    ix. capturing, by the camera (100), the displayed input image.

16. The system of claim 15, wherein the memory component further comprises instructions for:
  a. identifying differences between a predicted saturation of the input image and the saturation of the captured input image, and
  b. changing a baseline exposure value of the camera (100) to account for the differences.

17. The system of claim 5, wherein the memory component further comprises instructions for:
  a. detecting, by the camera (100), change in the ambient light by determining whether the captured input image satisfies the minimal saturation criterion;
  b. estimating new ambient light at the optimal reference exposure;
  c. changing the optimal reference exposure value of the camera (100) to account for the new ambient light; and
  d. changing the ambient light to the new ambient light.

18. The system of claim 15, wherein the camera (100) and the display device (200) are coupled into a single device.

19. The system of claim 15, wherein the camera (100) and the display device (200) are coupled to the computing device (300) by a wireless component.

20. The system of claim 15, wherein the camera (100) and the display device (200) are coupled to the computing device (300) by a wired component.

21. The system of claim 15, wherein the relative properties of the input image comprise spatial brightness and color properties.

22. The system of claim 15, wherein the reference image comprises a pattern of black pixels and non-black pixels.

23. The system of claim 22, wherein the reference image comprises 25% to 75% black pixels.

24. The system of claim 22, wherein the pattern of the reference image comprises stripes, blobs, or patches of different sizes.

25. The system of claim 15, wherein the display device comprises a projector or a display panel.

26. The system in claim 15, wherein the exposure prediction and control is done to capture videos in real-time.

27. The system in claim 15, wherein the display surface is planar or non-planar.

28. A method for prediction of ambient light and adjustment of an exposure value of a camera (100) in order to capture a display of an input image, in response to said prediction, the method comprising:
  a. displaying, by a display device (200), one or more reference images;
  b. capturing, by the camera (100), the one or more reference images at one or more camera exposures to generate a plurality of calibration images;
  c. predicting an optimal reference exposure and a corresponding optimal reference image based on a minimal saturation criterion applied to the plurality of calibration images;
  d. estimating the ambient light at the optimal reference exposure;
  e. identifying relative properties of an input image in comparison to the optimal reference image;
  f. predicting an optimal exposure based on the relative properties of the input image, the ambient light and the optimal reference exposure; and
  g. adjusting the exposure value of the camera (100) based on the optimal exposure.

29. A system for prediction of ambient light and adjustment of an exposure value of a camera (100) to capture a display of an input image in response to said prediction, the system comprising:
  a. the camera (100) capable of capturing images;

b. a display device (200) capable of displaying images; and
c. a computing device (300) communicatively coupled to the camera (100) and the display device (200), comprising a processor capable of executing computer-readable instructions and a memory component comprising computer-readable instructions for:
   i. displaying, by the display device (200), one or more reference images;
   ii. capturing, by the camera (100), the reference images at one or more camera exposures to generate a plurality of calibration images;
   iii. predicting an optimal reference exposure and a corresponding optimal reference image based on a minimal saturation criterion applied to the plurality of calibration images;
   iv. estimating the ambient light at the optimal reference exposure;
   v. identifying relative properties of an input image in comparison to the optimal reference image;
   vi. predicting an optimal exposure based on the relative properties of the input image, the ambient light and the optimal reference exposure; and
   vii. adjusting the exposure value of the camera (100) based on the optimal exposure.

* * * * *